United States Patent [19]

Kimura et al.

[11] 4,332,690

[45] Jun. 1, 1982

[54] HEAT STORAGE SYSTEM COMPRISING A PHASE CHANGE MEDIUM AND A NUCLEATING AGENT

[75] Inventors: Hiroshi Kimura; Junjiro Kai, both of Amagasaki, Japan

[73] Assignee: Mitsubishi Denki Kabushiki Kaisha, Tokyo, Japan

[21] Appl. No.: 141,314

[22] Filed: Apr. 18, 1980

[30] Foreign Application Priority Data

Dec. 4, 1979 [JP] Japan .................................. 54-158810
Dec. 20, 1979 [JP] Japan .................................. 54-166342

[51] Int. Cl.$^3$ ........................... C09K 3/18; F28D 13/00
[52] U.S. Cl. ................................. 252/70; 165/DIG. 4; 165/104.17
[58] Field of Search ................. 252/67, 70; 126/400; 165/DIG.4, DIG. 17, 104 S

[56] References Cited

U.S. PATENT DOCUMENTS 3,834,456 9/1974 Clarke et al. ........................ 165/104
3,976,584 8/1976 Leifer ................................... 252/77
4,209,413 6/1980 Kent et al. ............................ 252/70

FOREIGN PATENT DOCUMENTS 762890 7/1971 Belgium .
54-115681 9/1979 Japan .

OTHER PUBLICATIONS

Gas Hydrates In Aqueous-Organic Systems, III. Hydrates Formation In Polyacrylamide Gel; by G. V. Hulle, O. Fennema, and W. D. Powrie; Cryobiology, vol. 2, No. 5. (1966), pp. 246-255.

*Primary Examiner*—P. E. Willis, Jr.
*Attorney, Agent, or Firm*—Oblon, Fisher, Spivak, McClelland & Maier

[57] ABSTRACT

A heat storage system comprises a phase change medium and a nucleating agent. The phase change medium is prepared by mixing a gest molecule and water if necessary, with a gelating agent, an emulsifier and/or a furan compound. The nucleating agent is filled in a capillary or a porous substrate.

10 Claims, 8 Drawing Figures

HEAT STORAGE SYSTEM COMPRISING A PHASE CHANGE MEDIUM AND A NUCLEATING AGENT

BACKGROUND OF THE INVENTION

1. Field of the Invention

The present invention relates to a heat storage system which comprises a phase change medium and a nucleating agent. More particularly, it relates to a regenerative device which comprises a gas hydrate as a phase change medium and a clathrate as a nucleating agent.

2. Description of the Prior Arts

Various substances beside ice have been studied as a phase change medium for cooling which utilizes heat of fusion, however only ice has been practically used. Tetradecane ($C_{14}H_{30}$) has a melting point of 5.5° C. and is expected to be usable as the phase change medium, however it is one of the paraffins where the thermal conductivity is only about ¼ of that of water and a heat of fusion is only about 40 cal per unit volume.

Among clathrates of water which have dodecahedron structure as the basic crystalline form and have a melting point of 0° to 10° C., hydrate of trichlorofluoromethane ($CCl_3F \cdot 17H_2O$: melting point of 8.5° C.) has been considered to be useful as the phase change medium for cooling. Melting points and heats of fusion of certain gas hydrates are shown in Table 1.

TABLE 1

Melting point and heats of fusion of various gas hydrates

| Gas hydrate | | | Melting point (°C.) | Heat of fusion (Cal/g) |
|---|---|---|---|---|
| Guest molecule | Name | Formula | | |
| $C_2H_5Cl$ | ethyl chloride | $C_2H_5Cl \cdot 17H_2O$ | 4.8 | 69* |
| $CCl_3F$ | trichlorofluoromethane** | $CCl_3F \cdot 17H_2O$ | 8.5 | 65* |
| $CHCl_2F$ | dichlorofluoromethane** | $CHCl_2F \cdot 17H_2O$ | 8.7 | 64* |
| $C_4H_8O$ | tetrahydrofuran | $C_4H_8O \cdot 17H_2O$ | 4.0 | 55 |
| $(CH_3)_3N$ | trimethyl amine | $(CH_3)10\frac{1}{4}H_2O$ | 5.2 | 41 |

Note
*The heat of fusion of the guest molecule at converting into liquid.
**Trichlorofluoromethane is referred as R11. Dichlorofluoromethane is referred as R21.

Ethyl chloride, R11 and R21 among the gas hydrates shown in Table 1 are respectively separated into two phases of the liquid guest molecule and water in the molten state, and accordingly, it is indispensable to stir them in the formation of a hydrate crystal. On the other hand, hydrates of tetrahydrofuran or trimethylamine respectively form each aqueous solution on their melting whereby it is not always necessary to stir them.

The problem for practically using these gas hydrates to impart the function as a phase change medium, is how to form nuclei and to form the gas hydrate crystal inside of the medium in a supercooling state. It has been desired to attain high reliability and high velocity. These gas hydrates, however, easily experience supercooling state thereby taking a long time for the nucleating (formation of nuclei).

It has been known that when a light gas such as $CO_2$ is incorporated into the gas hydrate, it serves as a helping gas to facilitate the formation of nuclei. In this method, however, an autoclave is required which is not easy to use as it is a large size device. An antisupercooling agent for the gas hydrate has not been known.

SUMMARY OF THE INVENTION

The present invention is to overcome such disadvantages of the conventional devices.

It is an object of the present invention to provide a heat storage system which prevents a supercooling of a gas hydrate having dodecahedron structure as the basic structure in high reliability, that is, to initiate a formation of nuclear of clathrate for water so as to provide practical use as a heat storage system for cooling.

The foregoing and other objects of the present invention have been attained by providing a heat storage system which comprises a phase change medium which is characterized by a phase conversion at a specific temperature and a nucleating agent for initiating a crystallization of the phase change medium wherein a gas hydrate having dodecahedron structure as the basic crystal structure is used as the phase change medium and a clathrate for water which has a dodecahedron structure different from that of the gas hydrate as the basic crystal structure, as a nucleating agent.

DETAILED DESCRIPTION OF THE PREFERRED EMBODIMENTS

The inventors have tested concerning of a synergistic effect for preventing the supercooling between gas hydrates. As a result the synergistic effect for preventing supercooling between various gas hydrates is found in spite of differences of chemical formulas, crystal form and lattice constant of the gas hydrates.

Certain examples are shown in Table 2 wherein the reference ○ designates the break of the supercooling to attain the antisupercooling.

TABLE 2

Synergistic effect for preventing supercooling between various gas hydrates

| | supercooling medium (°C.) | | | | |
|---|---|---|---|---|---|
| seed crystal(°C.) | $C_2H_5Cl \cdot 17H_2O$ | $R11 \cdot 17H_2O$ | $THF \cdot 17H_2O$ | $TMA \cdot 10\frac{1}{4}H_2O$ | $(Bt)_4NBr \cdot 32.6H_2O$ |
| $C_2H_5Cl \cdot 17H_2O$ | | ○ | ○ | ○ | ○ |
| $R11 \cdot 17H_2O$ | ○ | | ○ | ○ | ○ |
| $THF \cdot 17H_2O$ | ○ | ○ | | ○ | |
| TMA . | ○ | ○ | ○ | ○ | ○ |

TABLE 2-continued

Synergistic effect for preventing supercooling between various gas hydrates

| seed crystal(°C.) | supercooling medium (°C.) | | | | |
|---|---|---|---|---|---|
| | $C_2H_5Cl$ . $17H_2O$ | R11 . $17H_2O$ | THF . $17H_2O$ | TMA . $10\frac{1}{4}H_2O$ | $(Bt)_4NBr$ . $32.6H_2O$ |
| $10\frac{1}{4}H_2O$ | | | | | |
| $(Bt)_4NBr$ . $32.6H_2O$ | | | | | |

Note
THF: tetrahydrofuran;
TMA: trimethylamine;
$(Bt)_4NBr$: tetrabutyl ammonium bromide.

In Table 3, crystalline forms and lattice constants of various gas hydrates of Table 2 are shown.

TABLE 3

| Crystalline structure of various gas hydrates | | | |
|---|---|---|---|
| | | Lattice constant (Å) | |
| Gas hydrate | Crystal form | a | b |
| R11 . $17H_2O$ | cubic | 17.3 | — |
| TMA . $10\frac{1}{4}H_2O$ | hexagonal | 12.41 | 12.50 |
| $(Bt)_4NBr$ . $32.6H_2O$ | tetragonal | 23.65 | 12.50 |

In Table 3, the crystal structures of ethyl chloride hydrate ($C_2H_5Cl.17H_2O$) and tetrahydrofuran hydrate ($THF.17H_2O$) are not shown however, they are classified into a group of II-form gas hydrates as the same as trichlorofluoromethane hydrate ($R11.17H_2O$); and have the same crystal form and the lattice constance as those of the trichlorofluoromethane hydrate ($R11.17H_2O$).

The synergistic effect for preventing supercooling between gas hydrates has not been clearly understood. Thus, this is the unusual phenomenon over the normal consideration that an antisupercooling effect is given when the crystal forms or the lattice constants are the same.

In Table 3, the example of tetrabutylammonium bromide hydrate is shown but analogous compounds such as tetraisoamylammonium salt hydrate shown in Table 4 have effect for preventing supercooling the same as that of tetrabutylammonium bromide hydrate. The characteristics of these hydrates are shown in Table 4.

TABLE 4

| Characteristics of tetraalkylammonium salt hydrates | | | | | |
|---|---|---|---|---|---|
| Hydrate | Melting point of hydrate (°C.) | Crystal form | Lattice constant (Å) | | |
| | | | a | | c |
| $(Bt)_4NF$ . $34.4H_2O$ | 24.9 | cubic | 23.78 | | 12.53 |
| $(Bt)_4NCl$ . $38.8H_2O$ | 15.7 | " | 23.77 | | 12.61 |
| $(Bt)_4NBr$ . $32.6H_2O$ | 12.5 | " | 23.65 | | 12.50 |
| $(Bt)_4NCH_3COO$ . $31.3H_2O$ | 15.1 | " | 23.62 | | 12.38 |
| $((Bt)_4N)_2CrO_4$ . $65.1H_2O$ | 13.6 | " | 23.68 | | 12.40 |
| $((Bt)_4N)_2WO_4$ . $62.7H_2O$ | 15.1 | " | 23.52 | | 12.37 |
| $((Bt)_4N)_2C_2O_4$ . $64H_2O$ | 16.8 | " | 23.63 | | 12.31 |
| $(Bt)_4NHCO_3$ . $32H_2O$ | 17.8 | " | 23.77 | | 12.46 |
| $((Bt)_4N)_2HPO_4$ . $64.2H_2O$ | 17.2 | " | 23.55 | | 12.34 |
| | | | a | b | c |
| $(i-A)_4NF$ . $40H_2O$ | 31.2 | rhombic | 12.08 | 21.61 | 12.82 |
| $(i-A)_4NCl$ . $38.3H_2O$ | 29.8 | rhombic | 11.98 | 21.48 | 12.83 |
| $((i-A)_4N)_2CrO_4$ . $78.2H_2O$ | 21.6 | rhombic | 12.18 | 21.53 | 12.67 |
| $((i-A)_4N)_2WO_4$ . $75.4H_2O$ | 22.4 | rhombic | 12.06 | 21.39 | 12.70 |

TABLE 4-continued

| Characteristics of tetraalkylammonium salt hydrates | | | | | |
|---|---|---|---|---|---|
| Hydrate | Melting point of hydrate (°C.) | Crystal form | Lattice constant (Å) | | |
| | | bic | | | |

Note
Bt: butyl group ($—C_4H_9$);
i-A: isoamyl group ($—C_5H_{11}$)

The data are given by the following references.
(1) R. K. McMullan & G. A. Jeffrey; J. Chemical Physical 31 No. 5, 1231 (1959).
(2) G. Beurskens, G. A. Jeffrey & R. K. McMullan; J. Chem. Phys., 39 No. 12, 3311 (1963).

It is found that tetrabutylammonium salt hydrates and tetraisoamylammonium salt hydrates have melting points higher than about 10° C. at about an ambient temperature. These hydrates are effective for preventing supercooling of the effective gas hydrates having melting points of less than 10° C. and accordingly, they are useful as an antisupercooling agent in the seed crystal method.

The present invention have been based on these findings and is to provide a heat storage system which is simple and economical and has high reliability without any special limitation for a configuration because any stirring means is not required though the conventional heat storage system comprising a gas hydrate should have a stirring means.

The regenerative device of the present invention can comprises a gelating agent such as gelatin and polyvinyl alcohol, together with a nucleating agent, whereby the following advantages can be expected.

(1) A gelated composition is stable and is not decomposed in stable during a repeating heat circle and is not aged.

(2) A gelated composition is homogeneous to attain a constant formation velocity and the hydrate formation ratio.

(3) A gelated composition is homogeneous to prevent a thermal nonuniformity in a regenerative vessel or container during melting or solidification thereof.

The phase change medium of the present invention can comprise an emulsifier such as nonionic polyoxyethylene type surfactants. The following advantages can be expected.

(1) A formation velocity of the hydrate is usually improved for three times to the non-addition case.

(2) A hydrate formation ratio is improved two times to the non-addition case to produce more than 75 wt. %, whereby the efficiency of the raw material is remarkably increased to reduce a loss.

(3) A high speed stirrer or a heavy duty stirrer is not required. It is economical and moreover, the formation can be performed even though the stirring is stopped several minutes after the initiation of the formation of the hydrate because of the effects stated in the paragraphs (1), (2).

(4) A formation velocity of the hydrate is high to maintain the heating at a temperature of about the melting point whereby the hydrate is produced at a ratio corresponding to the heat removing from the system. There is no heat loss to be economical in view of a thermal economy.

Figure 1:
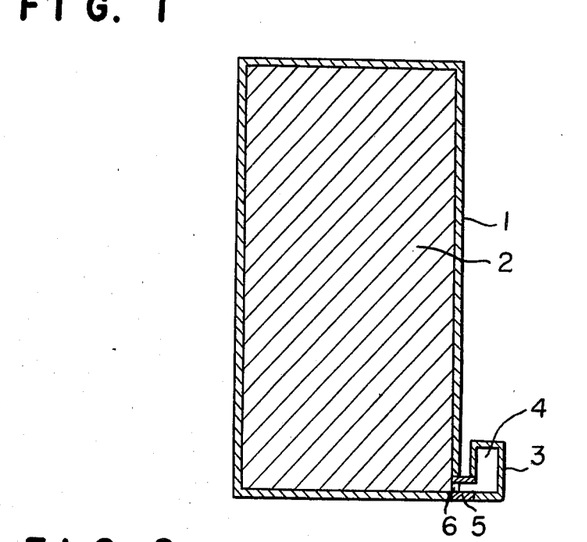
FIG. 1 is a sectional side view of one embodiment of a heat storage system of the present invention.

Referring to FIG. 1, one embodiment of the present invention will be illustrated.

In a main container (1) made of aluminum shown in FIG. 1, tetrahydrofuran hydrate (THF.17H$_2$O) as the phase change medium (2) is charged. In an auxiliary container (3), tetrabutylammonium fluoride ((Bt)$_4$NF) hydrate (4) as the nucleating agent is charged. A partition (6) made of a porous ceramic having a thickness of about 2 mm and pores having a diameter of about 10μ is placed in a connection tube (5) for connecting the main container (1) and the auxiliary container (2). Tetrahydrofuran hydrate (THF.17H$_2$O) (2) and tetrabutylammonium fluoride ((Bt)$_4$NF) hydrate (4) in liquid form the intersurface in the partition (6) so as to prevent the mixing thereof. At the solidification of tetrahydrofuran hydrate (THF.17H$_2$O) (2), the propagation of hydrate crystal as the growth of the crystal to the liquid tetrahydrofuran hydrate (THF.17H$_2$O) (2) is attained. When tetrabutylammonium fluoride hydrate (4) in the auxiliary container (3) is solidified, this is not melted in the condition of the use for rising to lower than about 20° C. whereby the effect for preventing supercooling for tetrahydrofuran hydrate (nucleating effect) is maintained and the solidification of tetrahydrofuran hydrate (2) is performed in a desired condition. Even though tetrabutylammonium fluoride hydrate (4) is melted, it is immediately solidified by cooling it to about 0° C. and accordingly, the effect for preventing supercooling for tetrahydrofuran hydrate (2) is not lost.

Figure 2:
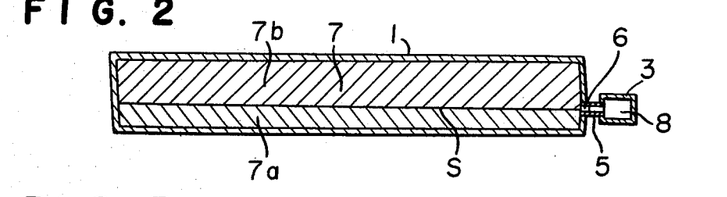
FIG. 2 is a sectional side view of the other embodiment of the present invention.

Referring to FIG. 2 one embodiment using trichlorofluoromethane hydrate (R11.17H$_2$O) will be described.

A main container (1) for containing trichlorofluoromethane hydrate (7) is different from the container shown in FIG. 1 and is a flat container having a height of 20 mm. A connection tube (5) is placed at the intersurface S between trichlorofluoromethane (7a) and water (7b). In the auxiliary container (3), tetraisoamylammonium fluoride hydrate (8) having a melting point of 31° C. is held in the auxiliary container (3). The porous partition (6) is the same as that of FIG. 1. When it is cooled, the supercooling is prevented by tetraisoamylammonium fluoride hydrate (8) whereby the growth of trichlorofluoromethane hydrate is started from the intersurface S between trichlorofluoromethane hydrate and water. Finally, trichlorofluoromethane hydrate (7) is grown in all parts. The condition that the effect for preventing supercooling for trichlorofluoromethane hydrate (7) by tetraisoamylammonium fluoride is always maintained as the same as that of the former embodiment.

When the heat storage system shown in FIGS. 1 and 2 are prepared by using ethyl chloride hydrate (C$_2$H$_5$Cl.17H$_2$O), dichlorofluoromethane hydrate (R21.17H$_2$O), trimethylamine hydrate ((CH$_3$)$_3$N.10$\frac{1}{4}$H$_2$O), sulfur hexafluoride hydrate or sulfur dioxide hydrate, it has been confirmed that the supercooling is prevented by tetraalkylammonium salt crystal held in the auxiliary container in each heat cycle. Tetraalkylammonium salt hydrate can be selected depending upon the condition of the use.

The porous partition (6) will be described in detail.

In order to attain the propagation of the gas hydrate crystal, the minimum diameter of pores of the porous partition (6) is about 1μ. In order to maintain the separation of the solid antisupercooling agent (crystalline accelerator) in the auxiliary container (3) to the liquid phase change medium in the main container (1), the maximum diameter of the pores is about 100μ. Therefore, in the structure of these embodiment, the diameter of the pores is usually in a range of 1 to 100μ.

The porous partition can be made of ceramics as well as organic substances e.g. fibrous materials, plastics.

In the above-mentioned embodiment, it has been discussed only for the system of two kinds of the gas hydrate such as ethyl chloride hydrate and R11 and the clathrate for water such as tetrabutylammonium salt hydrate. In order to prevent the phase separation of the guest molecule and water for the gas hydrate, and to stabilize it in the heat cycle, or to maintain a constant formation velocity of the hydrate, it is preferable to incorporate a gelating agent. In order to form a stable gel, it is preferable to incorporate a cross-linking agent. In order to increase the formation velocity the hydrate formation ratio, it is preferable to incorporate an emulsifier. The gelating agent and/or the emulsifier can be incorporated as desired. Various gelating agents can be used. A gelating agent which is dissolved into water to form a hydrogel such as gelatin is especially preferable. The other suitable gelating agents include polyacrylamides, polymethacrylamides, polyhydroxyalkylmethacrylates, polyvinylalcohols, poly N-vinyl-2-pyrrolidones, polyethyleneglycols. The gelating agent is preferably incorporated at a ratio of 1 to 10 wt. % based on water. When it is less than 1 wt. %, the gelation is not satisfactory whereas when it is more than 10 wt. %, the gel is too hard to reduce the hydrate formation ratio. This is disadvantageous for the phase storage medium. The gelating agent which forms a chemical gel such as polyacrylamide is preferably incorporated together with a redox polymerization initiator or a crosslinking agent so as to attain a desired gelation.

The polymerization initiators include a mixture of a peroxide such as benzoylperoxide and lauroylperoxide or a persulfate such as ammonium persulfates and an amine such as dimethylaniline, acetamide, formamide, monoethanolamine, triethylamine and tertbutylamine, or a mixture of said peroxide and an alkylmetal such as triethylaluminum, ethylsilver and diethylzinc; or a mixture of said persulfate and a reducing agent such as NaHSO$_4$, Na$_2$S$_2$O$_3$, Na$_2$SO$_3$ and ferrous salts.

The crosslinking agents can be N,N'-methylenebisacrylamide for the polyacrylamide; ethylenedimethacrylate or tetraethyleneglycol for the polyhydroxyalkylmethacrylate; sodium borate, dimethylolurea, trimethylolmelamine, aldehydes such as formaldehyde, acetaldehyde and acrolein; epoxy compounds such as epichlorohydrine and organic acids such as adipic acid, phthalic acid and thioglycolic acid for the polyvinyl alcohol; and formaldehyde, acetaldehyde and acrolein for gelatin. Two or more crosslinking agents can be incorporated.

When gelatin is incorporated as the gelating agent, the gel of the gelated composition containing 1 to 10 wt. % of gelatin is broken at higher than 30° C. The gelated composition can be used at lower than 20° C., without any problem, however the gel is broken in an atmosphere at higher than 30° C., whereby the characteristics as the phase change medium are deteriorated to limit the usage. When a gelatin content is more than 10 wt. %, the hydrate formation ratio and the formation velocity of the gas hydrate are remarkably inferior and a gelated composition desired as the phase change medium is not obtained.

When the crosslinking agent such as formaldehyde is incorporated in the gel containing 1 to 10 wt. % of gelatin, the crosslinking reaction is performed at an ambient temperature, whereby a three dimensional network is formed to improve the heat resistance. The crosslinking agent is preferably incorporated at a ratio of 2 to 0.1 wt. % based on gelatin. When it is more than 2 wt. %, a water leaching is caused by contraction of the gel, whereas when it is less than 0.1 wt. %, the effect of the crosslinking agent is not satisfactory.

When 0.1 to 2 wt. % of agar is incorporated, a hydrogel having a gel strength the same as that of the incorporation of 2 to 10 wt. % of gelatin. Most of the guest molecules break agar gel structure and accordingly, agar gel is not usually used.

The emulsifiers used in the present invention include polyoxyethylenealkylphenol ethers (the alkyl group is nonyl or octyl group) having HLB of 5 to 16; or polyoxyethylene alkyl ethers (the alkyl group is lauryl, oleyl, tridecyl group, cetyl or stearyl group) having HLB of 5 to 16; polyoxyethylenealkyl esters (the alkyl group is lauryl, oleyl or stearyl group) having HLB of 5 to 16; block copolymers of oxyethylene and oxypropyrene having more than 25 wt. % of oxyethylene groups. One or more emulsifiers can be incorporated.

Typical emulsifiers include polyoxyethyleneoleyl ether $C_{17}H_{33}-O-(C_2H_4O)_nH$ (n=5; HLB=9.0); polyoxyethylenelauryl ether $C_{11}H_{23}-O-(C_2H_4O)_nH$ (N=5; HLB=10.8); polyoxyethylenelaurate (HLB=10.5); polyoxyethyleneoleate (HLB=9.0); and block copolymer of oxyethylene and oxypropylene (molecular weight=about 3000; oxyethylene groups=about 40 wt. %). Polyoxyethylenenonylphenyl ethers having HLB of 8.9 to 16.0 are also effective.

Sorbitane type emulsifiers, sorbitane substitute type emulsifiers, block copolymers of oxyethylene and oxypropylene having less than 20 wt. % of oxyethylene group are not so effective for the formation of the gas hydrate.

The emulsifier is preferably incorporated at a ratio of 0.5 to 5 wt. % based on water. When it is less than 0.5 wt. %, the effect is not satisfactory whereas when it is more than 5 wt. %, the formation velocity for the gas hydrate is inferior and it is not economical.

When a special compound such as furan is incorporated with the emulsifier, the formation velocity is increased so as to follow the cooling velocity and the upper limit of the hydrate formation ratio is remarkably improved. It is preferable to contact an aqueous solution containing 0.5 to 5 wt. % of an emulsifier, and 1 to 10 wt. % of a compound selected from the group consisting of tetrahydrofuran, furan, methylfuran and methyltetrahydrofuran with the guest molecule to form the phase change medium containing the gas hydrate. When the specific furan compound is incorporated with the emulsifier, the time required for the initiation of solidification can be remarkably shortened as the additional remarkable advantageous effect. When the ratio of the special furan compound to water is less than 1 wt. %, the effect is not remarkable whereas when it is more than 10 wt. %, a further effect for shortening the time required for the initiation of solidification.

The present invention will be further illustrated by certain examples using the gelating agents, the crosslinking agents and the emulsifiers which are provided for purposes of illustration only and are not intended to be limiting the present invention.

EXAMPLE 1

Trichlorofluoromethane was used as a guest molecule. A gelated composition was prepared by mixing 2 wt. % of polyoxyethylene type nonionic surfactant and 8 wt. % of gelatin with water and incorporating trichlorofluoromethane at a molar ratio of 1/17 based on water and thoroughly stirring and cooling it to lower than 10° C. Tetrabutylammonium fluoride hydrate as a nucleating agent was filled into a glass capillary tube having a diameter of 200 mm and a length of 10 mm and the capillary was dipped in the gelated composition. This phase change medium initiated the solidification without failure by cooling it to 3° C. and imparted a heat of fusion of more than 40 cal/g.

EXAMPLE 2

In $(R11_{0.5}: THF_{0.5}).17H_2O$ and water 1 wt. % of polyoxyethylene type nonionic surfactant and 6 wt. % of acrylamide (based on water) were added and a redox polymerization initiator was added and the mixture was thoroughly stirred and cooled to prepare a polyacrylamide gel. Tetraisoamylammonium chloride hydrate as a nucleating agent was filled in a porous ceramic having a diameter of 3 mm and pores having a diameter of 100 $\mu$m. This was dispersed in the gelated composition by incorporating it before the gelation. The phase change medium initiated a solidification by cooling it to 4° C. and imparted a heat of fusion of higher than 50 cal/g.

Figure 3:
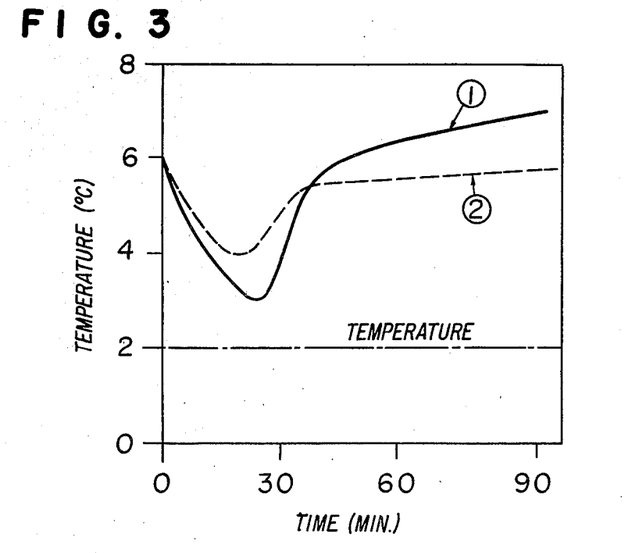
FIG. 3 is a characteristic diagram showing variation of temperature at a solidification of a phase change medium.

FIG. 3 is a characteristic diagram showing the variation of temperature at the solidification of the phase change medium in Examples 1 and 2 (the ordinate: Temperature (° C.) and the abscissas: Time (min.). In FIG. 3, the curves ①, ② show the variations of the temperatures of the phase change media of Examples 1 and 2 at the center which show the temperatures for initiating the solidifications when each gas hydrate was melted at 15° C. and dipped into cold water at 2° C. In Figure, it is found that the solidification of the gas hydrate was initiated when it was cooled to 3° C. in the curve ① and to 4° C. in the curve ② and then the rising of the temperature of the sample was resulted during the solidification of the gas hydrate.

As described above, in the structures of Examples 1 and 2, it is unnecessary to separate the nucleating agent from the gelated composition of the gas hydrate by a special structure and it is also unnecessary to equip a special seed crystal remaining tube. The heat storage system which is simple and practically usable and has stable heat-cycle can be obtained.

The nucleating agent is usually filled in a liquid form into a capillary made of glass, metal, ceramic or plastic or a porous substrate made of said material which has diameter of less than 300 $\mu$m. The capillary can be straight or curved and either both ends are opened or one end is opened and preferably has a length of longer than 1 mm. The porous substrate can have a desired configuration.

The nucleating agent can be dispersed in the gel of the gas hydrate by either of the following methods. One method is to add simultaneously the nucleating agent during the stirring for forming the gelated composition, whereby the dispersion is completed at the end of the gelation. The other method is to insert the nucleating agent into the gelated composition by a suitable manner. The same effect is attained by either of the methods and accordingly, it can be selected as desired depending upon the kinds of the gel.

The nucleating agent inserted or dispersed in the gelated composition is not permeated into the gelated composition and it is remained in the capillary or the porous substrate when the diameter of the capillary or the porous substrate is only less than 300 $\mu$m. When the diameter is more than 500 $\mu$m, sometimes, the nucleating agent is permeated into the gelated composition to lose its effect. When the diameter is less than 5 μm, it is not easy to fill the nucleating agent. Therefore, the diameter of the capillary or the porous substrate is usually in a range of 5 to 300 μm.

When the gelated composition containing the nucleating agent is cooled, the nucleating agent is solidified and the supercooling of the gas hydrate is broken by the nucleating agent whereby the solidification of the gas hydrate is initiated. When the gelated composition is heated the gas hydrate having a melting point of lower than 10° C. is melted. When the upper limit of the heating is lower than the melting point of the nucleating agent, the nucleating agent is not melted to maintain the solid state. In the repeating heat-cycle, the solidification of the gas hydrate is initiated from the nucleating agent.

Even though there is supercooled nucleating agent is placed in the gelated composition, the supercooling is broken to initiate the solidification by the synergitic effect for preventing supercooling between them when the gas hydrated is solidified. Therefore, it is unnecessary to solidify the nucleating agent at the beginning and it is unnecessary to consider the solidification of the nucleating agent.

The number of the nucleating agent parts can be selected depending upon the heat radiation velocity. It is enough to place more than one of the nucleating agent parts per 100 cc of the gelated composition. Even though the nucleating agent is slightly expensive than the gas hydrate, the increase of the cost for the addition is negligible. Therefore, an economical and effective gelated composition can be obtained.

EXAMPLE 3

Into water, 4 wt. % of gelatin was added and dissolved and then trichlorofluoromethane (R11) was added and the mixture was stirred and cooled to obtain a gelatin gel in which trichlorofluoromethane was uniformly dispersed. As shown by the full line in FIG. 4, the hydrate formation ratio for $R11.17H_2O$ in the gel was about 50 wt. %. Even though the concentration of gelatin was varied, the hydrate formation ratio was not substantially varied. Thus, the ratio of gelatin is usually in a range of 1 to 10 wt. % based on water. When it is less than 1 wt. %, the gelation is not satisfactory whereas when it is more than 10 wt. %, a gel having too high strength is formed to give the hydrate formation ratio of less than 30 wt. %. These are not effective.

EXAMPLE 4

Figure 4:
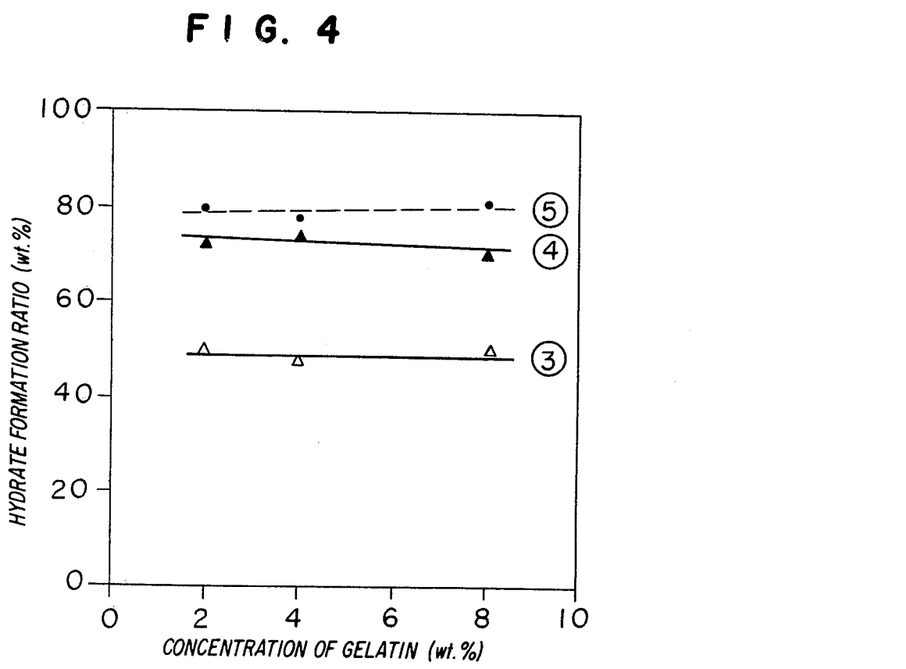
FIG. 4 is a characteristic diagram showing a hydrate formation ratio to a concentration of gelatin gel.

In order to satisfactory disperse trichlorofluoromethane (R11) in water, 2 wt. % of a polyoxyethylene type nonionic surfactant (polyoxyethylenenonylphenyl ether HLB: 123) was added to the components of Example 3. As a result, as shown by the full line ④ in FIG. 4, the conversion to form the hydrate was increased for about 20 wt. %, to give the total of about 70 wt. % and the heat of fusion was more than 40 cm²/g. Even though the concentration of gelatin was varied as shown in FIG. 4, the hydrate formation ratio is not substantially varied. The optimum concentration of the nonionic surfactant was in a range of 0.5 to 5 wt. %. When the concentration of the nonionic surfactant is less than 0.5 wt. %, the hydrate formation ratio is not so improved whereas when it is more than 5 wt. %, a gel structure is broken and the hydrate formation ratio is remarkably lowered. These are not effective.

EXAMPLE 5

When 6 wt. % of tetrahydrofuran (THF) was added to the components of Example 4. As a result, as shown by the broken line ⑤ in FIG. 4, the hydrate formation ratio was increased for about 10 wt. % than that of the addition of the nonionic surfactant to give the total of about 80 wt. % and the heat of fusion was about 50 cm²/g. In this case, the hydrate formation ratio is not depending upon the concentration of the gelatin to be substantially constant.

The optimum concentration of tetrahydrofuran is in a range of 1 to 10 wt. %. When it is less than 1 wt. %, the hydrate formation ratio is not so improved whereas when it is more than 10 wt. %, a gel structure is broken and the hydrate formation ratio is remarkably lowered. These are not effective.

The gelation point of the gelatin gel is at 5° to 40° C. at the initial gelation, whereas it is higher than the ambient temperature by ageing since the gel structure is tightened. In the repeating heat-cycle, the same hydrate formation ratio without separating trichlorofluoromethane. The gelation point can be improved by incorporating formaldehyde.

EXAMPLE 6

Figure 5:
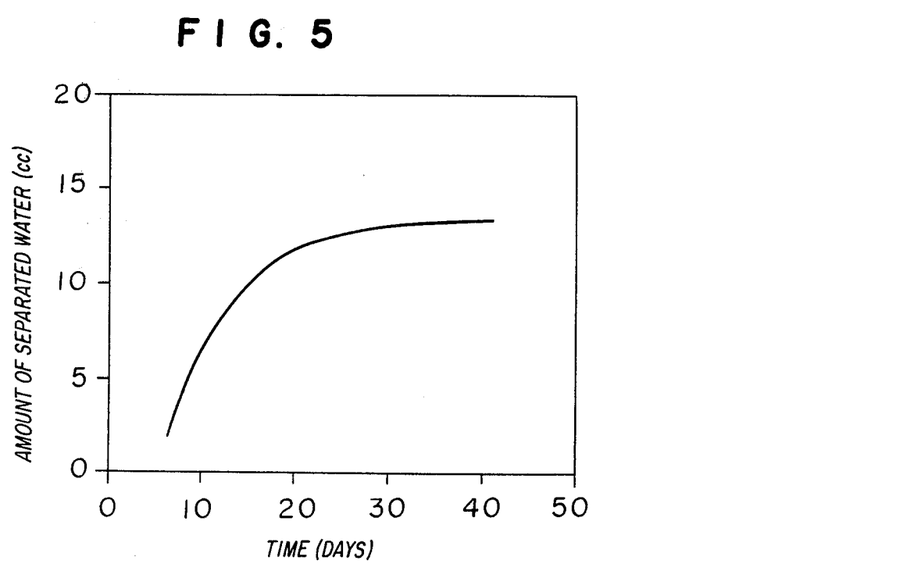
FIG. 5 is a characteristic diagram showing an amount of separated water in time (day)

FIG. 5 shows the variation of separated water in time when a sample prepared by adding formaldehyde at a ratio of 10 wt. % based on gelatin was aged at 5° C. Test results of separated water and gel breaking temperature the various ratios of formaldehyde are shown in Table 5. In the sample prepared by adding 3 wt. % of formaldehyde, the rate of the separation of water was slightly slow but about 70% of water was separated in comparison with the sample prepared by adding 10 wt. % of formaldehyde after several months. Therefore, it is not effective. When less than 1 wt. % of formaldehyde (based on gelatin) was added, the separation of water was not substantially found. The gel breaking temperature was lowered depending upon decrease of the ratio of formaldehyde. When it is less than 0.1 wt. %, the gel breaking temperature is decreased to the same as that of non-addition. This is lower than 20° C.

TABLE 5

| Ratio of formaldehyde (wt. % based on gelatin) | Gel breaking temperature (°C.) | Percent of separated water to total water (%) |
| --- | --- | --- |
| 10 | higher than 40° C. | more than 50% |
| 3 | " | 35% |
| 2 | " | 20% |
| 1 | " | 5% |
| 0.3 | 28° C. | nil |
| 0.1 | 24° C. | nil |
| 0 | lower than 20° C. | nil |

The samples contained 50 g of $(R11_{0.5}.THF_{0.5}).17H_2O$ and 2 wt. % of nonionic surfactant (based on the hydrate).

The samples were treated by 60 times of heat-cycle of 2° to 12° C. and then aged for 15 days.

The optimum ratio of the crosslinking agent should be decided from the viewpoints of the advantage of increase of gelation point of the gelatin gel and the disadvantage of separation of water caused by the contraction of the gel. From the results, it is found that the optimum ratio of formaldehyde is in a range of 2 to 0.1 wt. % based on gelatin. As the crosslinking agent, various aldehydes can be used beside formaldehyde. Acetaldehyde and acrolein as the unsaturated aldehyde impart substantially the same effect at the same ratio as that of formaldehyde.

The following effects are considered for the product of Example 5.

(i) The crosslinking agent is economical and can be effective at a small ratio.

(ii) In the crosslinking, any special technique is not required.

(iii) The gel having the characteristics the same as those of the expensive gel such as polyacrylamide gel can be obtained with only small cost.

(iv) A deterioration of the regenerative characteristics caused by improving the heat resistance is not substantially found.

(v) A deterioration of the regenerative characteristic in ageing is not substantially found.

(vi) This is a physical gel whereby it is easily produced without a complicated apparatus in comparison with the chemical gel which should be prepared under controlling the gelation.

EXAMPLE 6

In this example, aldehyde was also added.

A homogeneous aqueous solution was prepared by heating a mixture of 37.12 kg. of water and 2.8 kg. of gelatin and then 0.7 kg. of polyoxyethylene type non-ionic surfactant (HLB: 12.3) was added and then 4.4 kg. of tetrahydrofuran and 0.08 kg. of formaline (37 wt. % of formaldehyde) and 8.4 kg. of trichlorofluoromethane (R11) were added. The mixture was thoroughly mixed and cooled to lower than 10° C. to otain a regenerative medium having a melting point of 7.5° C. and a heat of fusion of higher than 50 cal/g.

EXAMPLE 7

Figure 6:
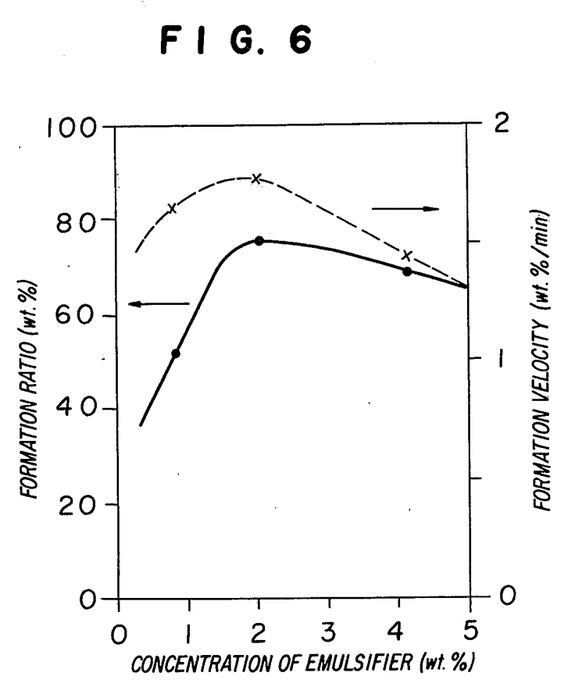
FIG. 6 is a characteristic diagram of a hydrate formation ratio to a concentration of an emulsifier.

FIG. 6 shows relation of the hydrate formation ratio to the concentration of the emulsifier in the preparation of trichlorofluoromethane (R11) hydrate (abscissa: concentration of emulsifier based on water (%) and ordinate: hydrate formation ratio for R11 (wt. %)).

In the test, the conventional mixer was used and the emulsifier was added to the composition of $R11.17H_2O$.

The concentration of the emulsifier is based on water ($17H_2O$). The emulsifier is polyoxyethylenenonylphenyl ether $(C_9H_{19}\!-\!\!\bigcirc\!\!-\!O(C_2H_4O)_n\!-\!H; n = 8; HLB = 123)$ (HLB is calculated by Griffin method (1954)).

When the concentration of the emulsifier was 0.8 wt. %, the effect for the hydrate formation ratio was not remarkable but the time for forming R11 hydrate was remarkably shortened in comparison with that of the non-addition. When the concentration of the emulsifier was 2 wt. %, the hydrate formation ratio and the formation velocity were substantially maximum. The hydrate formation ratio was increased to about 2 times and the formation velocity was increased to about 3.6 times (about 0.5 wt. %/min. in the non-addition) in comparison with those of the non-addition. When the concentration of the emulsifier was 4.2 wt. %, the hydrate formation ratio is not so much lower, but the formation velocity was remarkably lower than those of the addition of 2 wt. % of the emulsifier. In view of an economy, it is necessary to attain the maximum effect by an addition of a minimum amount of the emulsifier. Therefore, the concentration of the emulsifier is in a range of 0.5 to 5 wt. % in a practical application.

Figure 7:
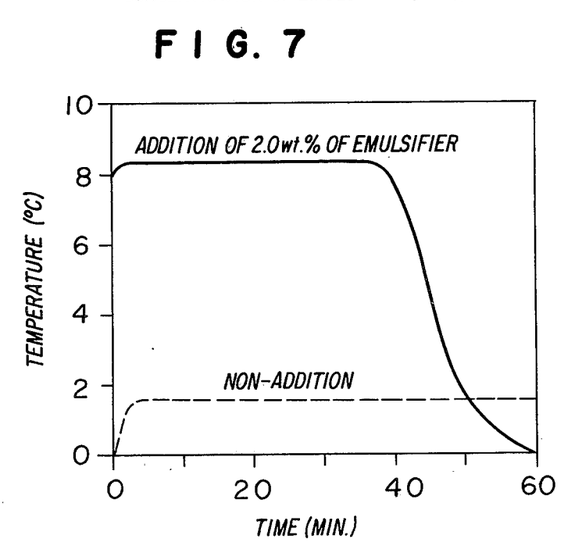
FIG. 7 is a characteristic diagram of variation of temperature at the solidification of the phase change medium in Example 7.

FIG. 7 shows the relation of heated temperatures in solidification in time in the cases of an addition of 2 wt. % of polyoxyethylenelaurate (HLB: 10.8) and non-addition. When the emulsifier was added, the heated temperature at about the melting point continued for a long time.

Figure 8:
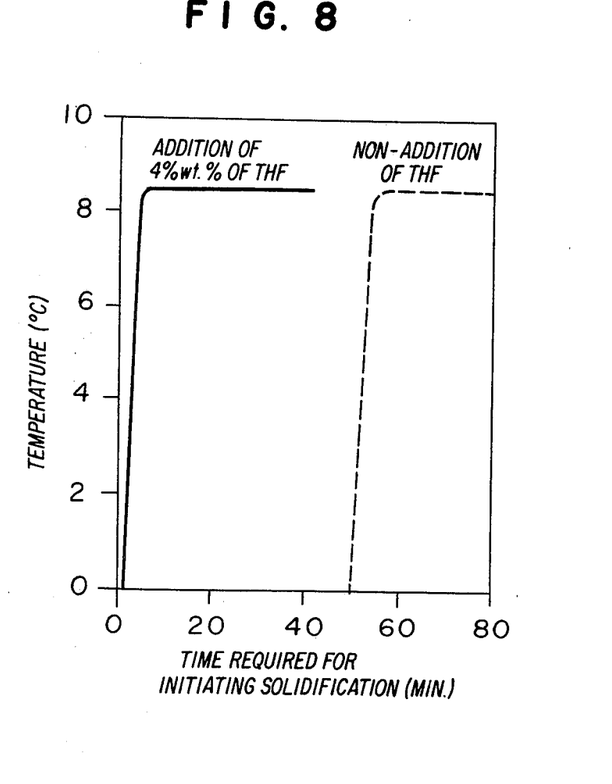
FIG. 8 is a characteristic diagram of relation of the time and the temperature until the initiation of solidification in the cases of only emulsifier and a combination of an emulsifier and tetrahydrofuran.

FIG. 8 is a characteristic diagram comparing the addition of 2.0 wt. % of the emulsifier (polyoxyethylenenonylphenyl ether HLB: 12.3) and the addition of 2.0 wt. % of the same emulsifier and 4.0 wt. % of tetrahydrofuran (THF). The trichlorofluoromethane hydrate was used in both cases. When the emulsifier and THF were added, the time required for initiating the solidification was only shorter than 1 min. whereas when THF was not added, it took about 50 min. The effect of the addition of THF for the nucleating is clearly found.

As it is found in the example, the emulsifier and THF had synergitic effect. Both the slow formation velocity as the disadvantage of $R11.17H_2O$ and the difficulty of the solidification can be overcome by combining the emulsifier and THF. Fran, methylfuran and methyltetrahydrofuran also impart the same effect as that of THF.

We claim:

1. In a heat storage system comprising a phase change medium which results in a phase conversion at a specific temperature and a nucleating agent for initiating a crystallization of said phase change medium, an improvement characterized in that a gas and water are present in contact with each other in the system in amount to form as the phase change medium a gas hydrate having a dodecahedron structure as the basic crystal structure and a clathrate for water which has a dodecahedron structure different from that of said gas hydrate is present as said nucleating agent, wherein said gas hydrate is a hydrate of ethyl chloride, trichlorofluoromethane, dichlorofluoromethane, tetrahydrofuran or trimethylamine or a mixture thereof and said nucleating agent is a hydrate of tetrabutylammonium salt or tetraisomylammonium salt, said nucleating agent being present in amount effective for initiating crystallization of the gas hydrate.

2. A heat storage system according to claim 1 wherein the crystallization of said phase change medium is initiated by said nucleating agent contacted with the phase change medium through a porous substrate.

3. A heat storage system according to claim 2 wherein the diameter of the pores of said porous substrate is small enough to form an interface between said liquid phase change medium and said solid nucleating agent in said porous substrate but is large enough to permit initiation of the crystallization of said liquid phase change medium by said nucleating agent.

4. A heat storage system according to claim 1 wherein said phase change medium comprises a gelating agent in amount sufficient to prevent separation of the gas and total water present in the system for forming the gas hydrate.

5. A heat storage system according to claim 4 wherein a porous substrate having a diameter of less than 300 μm or a capillary having a diameter of 5 to 300

μm in which said nucleating agent is filled is in the gelated composition of said gas hydrate.

6. A heat storage system according to claim 4 wherein said gelating agent is gelatin, polyacrylamide, polymethacrylamide, polyhydroxyalkylmethacrylate, polyvinyl alcohol, poly-N-vinyl-2-pyrrolidone or polyethyleneglycol and is incorporated at a ratio of 1 to 10 wt. % based on total water present in the system for forming the gas hydrate.

7. A heat storage system according to claim 4 wherein said gelating agent is gelatin and formaldehyde, acetaldehyde or acrolein is incorporated in said gelated composition of said gas hydrate at a ratio of 2 to 0.1 wt. % based on gelatin.

8. A heat storage system according to claim 4 wherein said phase change medium incorporates said gelating agent in amount of 1 to 10 wt. % based on the total water in the system for forming gas hydrate and a nonionic surfactant at a ratio of 0.5 to 5 wt. % based on such water.

9. A heat storage system according to claim 8 wherein said nonionic surfactant is a polyoxyethylenealkylphenol ether having HLB of 5 to 16; a polyoxyethylenealkyl ether having HLB of 5 to 16; or a polyoxyethylenealkyl ester having HLB of 5 to 16 or a block copolymer of oxyethylene and oxypropylene having oxyethylene groups of more than 25 wt. %.

10. A heat storage system according to claim 6 wherein said phase change medium incorporates a nonionic surfactant at a ratio of 0.5 to 5 wt. % based on such water and where there are about 17 mols of total water in the system per mol of gas present to form the gas hydrate.

* * * * *

UNITED STATES PATENT AND TRADEMARK OFFICE
CERTIFICATE OF CORRECTION

PATENT NO. : 4,332,690
DATED : June 1, 1982
INVENTOR(S) : HIROSHI KIMURA ET AL

It is certified that error appears in the above—identified patent and that said Letters Patent is hereby corrected as shown below:

Title page, left hand column, in between sections [22] and [51], add to section [30] the following priority information:

--April 23, 1979, Japan, 54-50386.--

Signed and Sealed this

Sixteenth Day of August 1983

[SEAL]

Attest:

GERALD J. MOSSINGHOFF

Attesting Officer          Commissioner of Patents and Trademarks